US006233920B1

(12) United States Patent
Presz, Jr. et al.

(10) Patent No.: US 6,233,920 B1
(45) Date of Patent: May 22, 2001

(54) CONTOURED THRUST REVERSER AND LOBED NOZZLE NOISE SUPPRESSOR FOR GAS TURBINE ENGINES

(75) Inventors: Walter M. Presz, Jr., Wilbraham, MA (US); Gary Reynolds, San Diego, CA (US)

(73) Assignee: Stage III Technologies, L.C.

( * ) Notice: Subject to any disclaimer, the term of this patent is extended or adjusted under 35 U.S.C. 154(b) by 0 days.

(21) Appl. No.: 09/491,683

(22) Filed: Jan. 26, 2000

Related U.S. Application Data
(60) Provisional application No. 60/118,059, filed on Feb. 1, 1999.

(51) Int. Cl.⁷ ....................................................... F02K 1/00
(52) U.S. Cl. ............................................................. 60/230
(58) Field of Search .................................. 60/226.2, 230, 60/262; 181/213, 215, 220; 239/265.29

(56) References Cited

U.S. PATENT DOCUMENTS

| 3,550,855 | * | 12/1970 | Feld et al. | 239/265.29 |
|---|---|---|---|---|
| 3,824,784 | | 7/1974 | Kitson et al. | |
| 3,856,239 | | 12/1974 | Leibach | |
| 4,005,836 | | 2/1977 | Mutch | |
| 4,129,269 | | 12/1978 | Fage | |
| 4,519,561 | | 5/1985 | Timms | |
| 4,581,890 | * | 4/1986 | Girand | 60/230 |
| 5,473,886 | | 12/1995 | Lebrun et al. | |
| 5,476,237 | | 12/1995 | Clarke | |
| 5,671,598 | * | 9/1997 | Standish | 60/226.2 |
| 5,716,025 | * | 2/1998 | Meyer | 244/110 B |
| 5,722,231 | | 3/1998 | Porte | |
| 5,761,900 | | 6/1998 | Presz, Jr. | |
| 5,779,192 | | 7/1998 | Metezeau et al. | |
| 5,794,433 | * | 8/1998 | Peters et al. | 60/226.2 |
| 5,819,527 | * | 10/1998 | Fournier | 60/226.2 |
| 5,875,995 | * | 3/1999 | Moe et al. | 244/110 B |
| 5,884,472 | | 3/1999 | Presz, Jr. et al. | |
| 5,956,939 | | 9/1999 | Fage | |

* cited by examiner

Primary Examiner—W Rodriquez
(74) Attorney, Agent, or Firm—Donald S. Holland, Esq.; Holland & Bonzagni, P.C.

(57) ABSTRACT

A contoured thrust reverser and lobed nozzle noise suppressor is meant for use with gas turbine engines that have conventional post-exit thrust reversers and that require only moderate levels of noise suppression. The contoured thrust reverser and lobed nozzle noise suppressor comprises a conventional tailpipe frame terminating in a lobed nozzle, and a conventional thrust reverser mechanism holding a pair of contoured blocker doors. In a deployed position, the blocker doors lie aft of the lobed nozzle, having been moved there by the thrust reverser mechanism. The blocker doors abut one another and form a fore-facing scoop, wherein any engine exhaust exiting the lobed nozzle is redirected towards the fore of the engine. In a stowed position, the blocker doors lie over the tailpipe frame and align and nestle together with the engine's cowling. Since the blocker doors partially overlap the lobed nozzle in this position, aft portions of each blocker door are contoured to correspond in shape to an exterior fore portion of the lobed nozzle of which they overlap. The lobed nozzle and contoured blocker doors provide a substantially continuous outer surface aerodynamically configured to help in mixing ambient air with engine exhaust, so as to reduce engine noise.

12 Claims, 5 Drawing Sheets

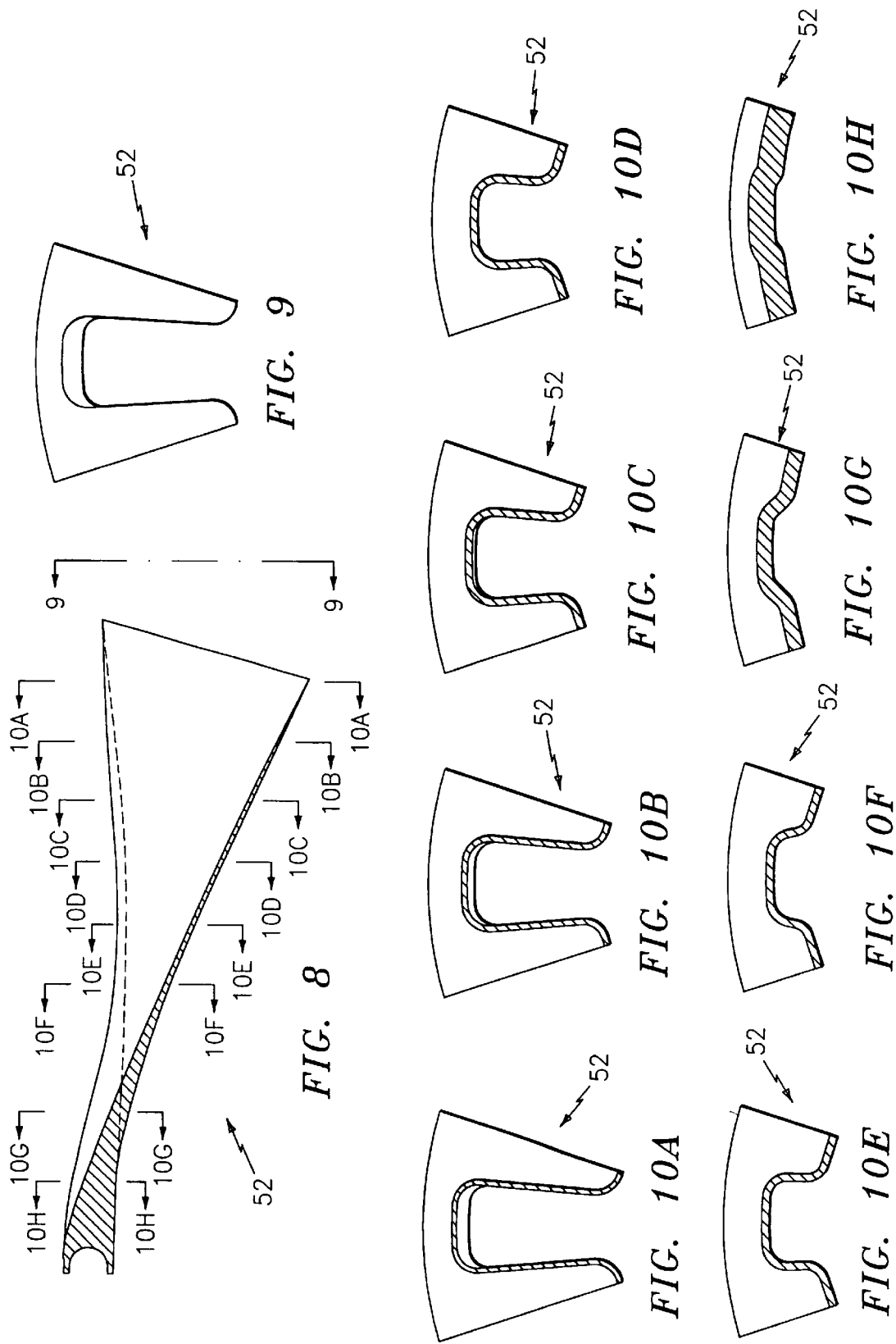

CONTOURED THRUST REVERSER AND LOBED NOZZLE NOISE SUPPRESSOR FOR GAS TURBINE ENGINES

This application claims priority from a Provisional Application, Ser. No. 60/118,059, filed Feb. 1, 1999.

FIELD OF THE INVENTION

The present invention relates to gas turbine engines, and, more particularly, to gas turbine engine thrust reverser and noise suppressor mechanisms.

BACKGROUND OF THE INVENTION

The use of gas turbine engine powered aircraft has greatly increased over the course of the past few decades, especially over urban areas. As a result, the United States government has imposed increasingly more stringent gas turbine engine noise standards meant to reduce noise pollution from airports and overhead passing jet aircraft. The latest standards are the federal "stage three" requirements.

Most older aircraft do not meet the stage three noise requirements. Some, like the common, business-class Gulfstream® GII, GIIB, and GIII jets, have low bypass ratio turbofan engines (with extremely high jet velocities), and miss the mark by a wide margin. Other, somewhat larger jets, such as the MD-80® manufactured by the Boeing Company, have quieter, high bypass ratio engines. However, even with these quieter engines, many such aircraft are still too noisy.

For example, the MD-80® jet has two fuselage mounted Pratt & Whitney® JT8D-219 gas turbine engines. Tests have shown that while some of the stage three requirements are met for these engines, some are not. More specifically, an MD-80® jet misses the stage three requirements for sideline and flyover noise by as much as about 0.3 dB. Although this is a fortuitously low amount, it still means that these engines need to be provided with some sort of noise reduction device for the airplane to meet federal requirements.

Unfortunately, many gas turbine engine noise suppressors are designed for noisy, low bypass ratio engines, wherein the gas turbine engine noise has to be reduced by as much as ten to twelve decibels. Although such a level of noise reduction would be advantageous for any type of airplane, it typically comes at the expense of a loss in cruise performance.

For example, to alleviate its noise problems, a Gulfstream® jet may be advantageously equipped with aft mounted mixer/ejector-type noise suppressors. These types of noise suppressors typically comprise an ejector shroud coupled to a lobed mixer, which replaces a gas turbine engine's existing round exhaust nozzle. Engine exhaust passes out the engine proper, through the lobed mixer, and into the ejector shroud. At the same time, cooler, lower velocity, ambient air outside the engine passes over the lobed mixer to enter the ejector shroud via spaces between the shroud and mixer. The lobed mixer causes the ambient air to quickly mix with the engine exhaust, creating a uniform flow by the time the combined gasses exit the ejector shroud, and cooling and slowing the engine exhaust. This lowers the engine's noise output, and actually increases available thrust. However, at the same time, because the lobed mixer extends into the exhaust stream, engine drag is slightly increased, resulting in a cruise performance loss of up to about seven percent.

Although such a loss is perfectly acceptable for smaller, private aircraft like the Gulfstream®, it would be very disadvantageous for larger, commercial airplanes like the MD-80®, where a seven percent loss in cruise performance would cost an airline company a lot of money in extra fuel and shortened airplane range. Moreover, because the MD-80® has relatively high bypass ratio engines (with subsequently lower jet velocities), noise suppressors designed for low bypass ratio engines (with supersonic jet velocities), such as those described above, would likely not work very well there with. For example, they might not absorb the necessary sound frequencies, and would likely not produce a proper exhaust/ambient air mixing effect.

Additionally, because MD-80® airplanes and similar aircraft are already so close to meeting the stage three requirements, and are otherwise perfectly functional, there is little need to outfit them with expensive noise reducers that would require replacing additional components of the airplane's engines. For example, aft mounted mixer-ejector noise suppressors are not compatible with "post-exit-" or "bucket-" type thrust reversers, such as those found on the Pratt & Whitney® JT8D-219 gas turbine engines.

By way of explanation, a thrust reverser is a mechanical device that is deployed to redirect exhaust flow from an aircraft's gas turbine engines, typically just subsequent to the aircraft landing. All thrust reversers are normally deployed during the landing sequence, after the nose wheel has touched down (usually called the "rollout"). Thrust reversers can greatly reduce the length of runway necessary to bring the aircraft to taxi speed, and they are also used when adverse weather conditions, such as ice on the runway, may cause the aircraft's brakes to be ineffective. As shown in FIGS. 1 and 2, conventional post-exit thrust reversers 20 redirect the engine exhaust after it leaves a round exhaust nozzle 22 via a set of "bucket" doors 24, 26 that open up behind the engine.

As should be appreciated, mixer/ejector noise suppressors need to be attached to the exit end of a gas turbine engine to function. In the case of the Pratt & Whitney® JT8D-219 gas turbine engines, such noise suppressors would have to be affixed to the engines in roughly the same spaces occupied by the engines' post-exit thrust reversers. Of course, this is impossible, and either the post-exit thrust reversers have to be replaced (at additional, unnecessary expense), or a different type of noise suppressor has to be used.

Accordingly, it is a primary object of the present invention to provide a unique contoured thrust reverser and lobed nozzle noise suppressor for gas turbine engines that lowers engine noise to a moderate extent while minimizing airplane cruise performance loss.

Another primary object is to provide a unique thrust reverser and noise suppressor mechanism that is compatible with an engine's existing, post-exit type thrust reverser via a minimal replacement of existing thrust reverser parts.

It is a more specific object to provide a post-exit thrust reverser with blocker doors having aft lobed sections that nestle into the complementary shaped lobes of an adjacent lobed nozzle, while stowed prior to deployment.

Yet another object of the present invention is to provide a unique pair of thrust reverser blocker doors that are aerodynamically compatible with a lobed nozzle noise suppressor.

SUMMARY OF THE INVENTION

In order to solve the aforementioned problems and meet the stated objects, the present invention discloses a combination contoured thrust reverser and lobed nozzle noise suppressor. The contoured thrust reverser and lobed nozzle noise suppressor is meant to be used with gas turbine engines that have conventional post-exit thrust reversers and that require only moderate reductions in noise. The contoured thrust reverser and lobed nozzle noise suppressor comprises a conventional tailpipe frame terminating at a lobed nozzle, and a conventional thrust reverser mechanism holding a pair of contoured blocker doors. Functionally, the lobed nozzle replaces the gas turbine engine's existing round exhaust nozzle, and the contoured blocker doors replace the engine's existing thrust reverser blocker doors.

In a deployed position, the blocker doors lie aft of the lobed nozzle, having been positioned there by the thrust reverser mechanism. The blocker doors abut one another, thereby forming a fore-facing scoop, wherein any engine exhaust exiting the lobed nozzle is redirected towards the fore of the engine.

In a stowed position, the blocker doors lie over the tailpipe frame generally to the fore of the lobed nozzle, and align with the engine's cowling. Aft portions of the blocker doors overlap an exterior fore portion of the lobed nozzle, and are contoured to correspond in shape thereto. The contoured aft portions of the blocker doors nestle within the uncovered aft portion of the lobed nozzle, thereby providing a substantially continuous outer surface aerodynamically configured to help in mixing ambient air with engine exhaust, so as to reduce engine noise. Thus, the lobed nozzle with the overlapping and nestled contoured blocker doors provides substantially the same mixing and noise reduction function as the lobed nozzle would by itself.

BRIEF DESCRIPTION OF THE DRAWINGS

These and other features, aspects, and advantages of the present invention will become better understood with respect to the following description, appended claims, and accompanying drawings, in which:

FIG. 8 shows one of a plurality of identical lobes of the lobed nozzle;

FIG. 9 is an end plan view of the FIG. 8 lobe, taken along line 9—9;

FIGS. 10A–10H are various cross-sectional views of the lobe shown in FIG. 8.

DETAILED DESCRIPTION OF THE PREFERRED EMBODIMENT

Figures 1, 2, 3:
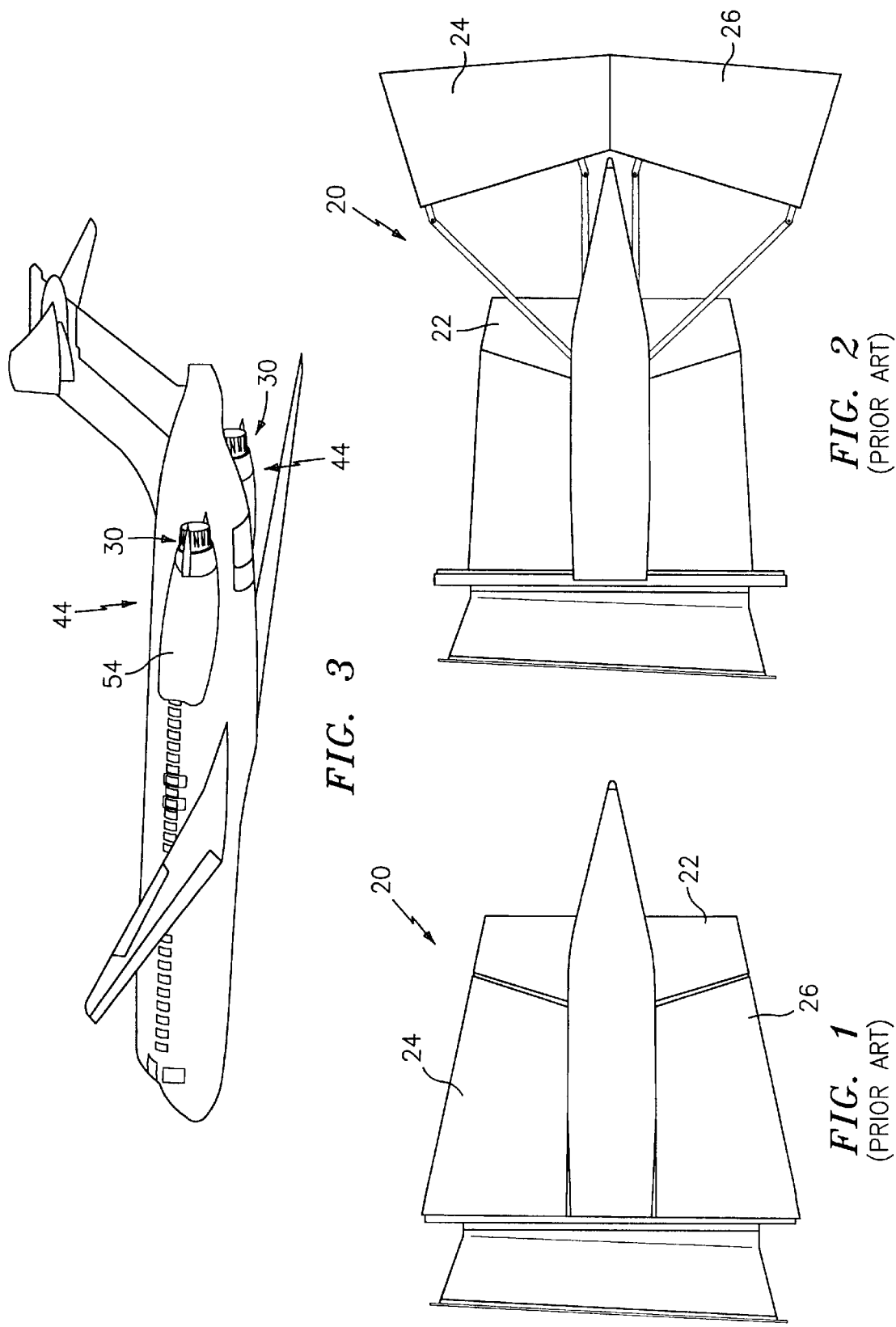
FIG. 1 is a side view of a post-exit thrust reverser in a stowed position, according to the prior art.
FIG. 2 is a side view of the post-exit thrust reverser of FIG. 1 in a deployed position, according to the prior art.
FIG. 3 is a perspective view of an airplane with two fuselage mounted engines each having a contoured thrust reverser and lobed nozzle noise suppressor according to the present invention.

Turning now to FIGS. 3–11, a preferred embodiment of a contoured thrust reverser and lobed nozzle noise suppressor 30 (hereinafter referred to as the "suppressor"), according to the present invention, will now be given. The primary components of the suppressor 30 are a lobed nozzle 32 (for mixing ambient air and engine exhaust), and a pair of contoured, bucket-type blocker doors 34, 36. In a stowed position, the contoured blocker doors 34, 36 lie in a retracted position back over a tailpipe frame 38. Since the contoured blocker doors 34, 36 necessarily overlap a fore portion of the lobed nozzle 32, aft portions 40 of each blocker door 34, 36 are contoured to correspond in shape to the overlapped fore portion. The lobed nozzle 32 and the overlapping blocker doors 34, 36 align and nestle together to provide an external surface aerodynamically configured to facilitate the lobed nozzle's 32 mixing/noise reduction function. When the blocker doors 34, 36 are in a deployed position, they meet to lie aft of, and obliquely to, the lobed nozzle 32. In this position, the blocker doors 34, 36 redirect any engine exhaust exiting the lobed nozzle generally towards the fore of the engine.

Figure 4:
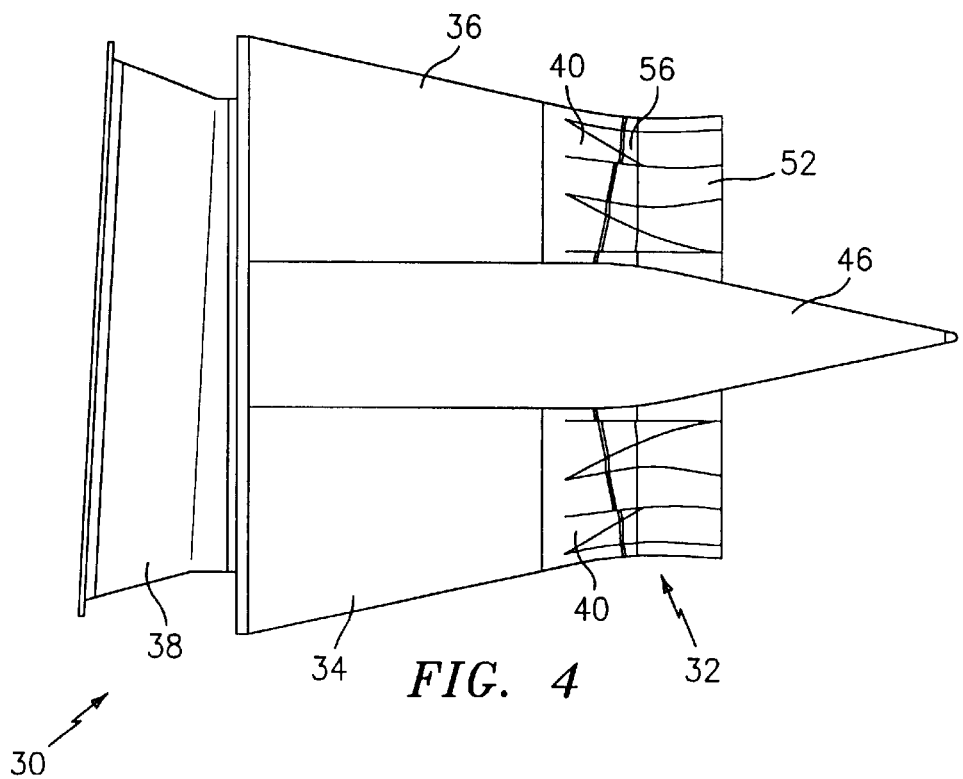
FIG. 4 is a side view of the contoured thrust reverser and lobed nozzle noise suppressor, according to the present invention, in a stowed position.
Figure 5:
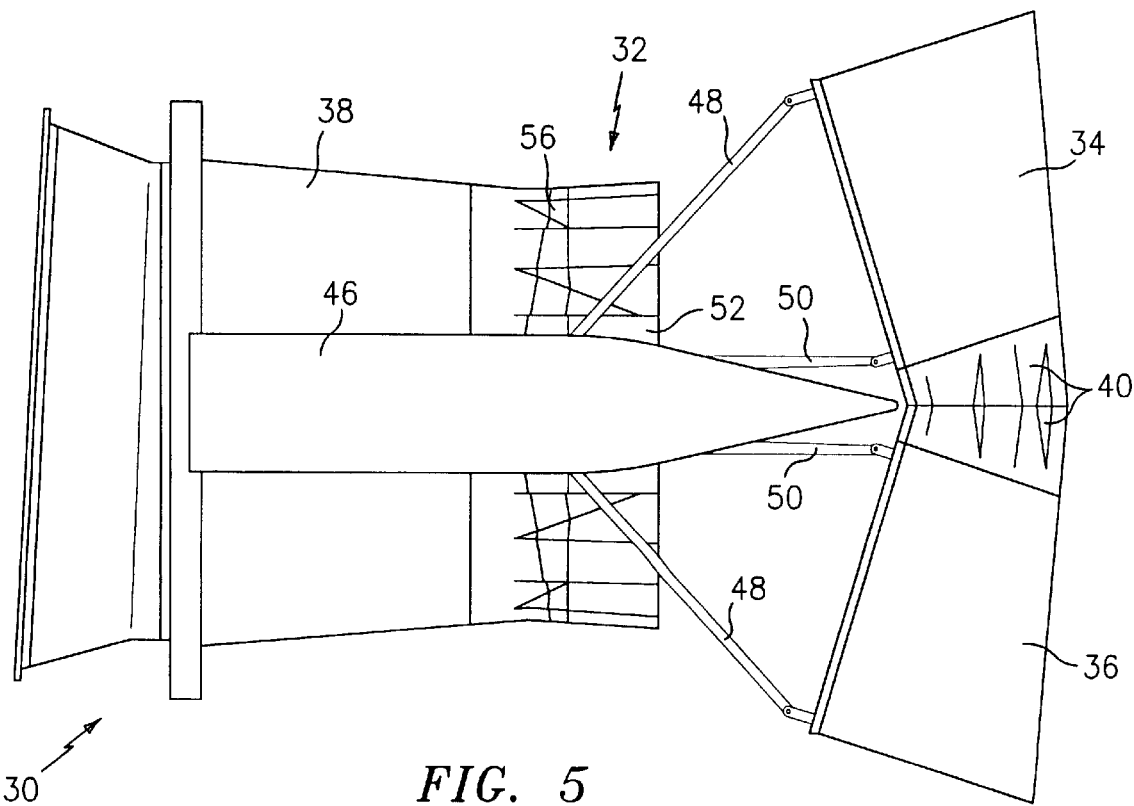
FIG. 5 is a side view of the contoured thrust reverser and lobed nozzle noise suppressor of the present invention in a deployed position.
Figure 7:
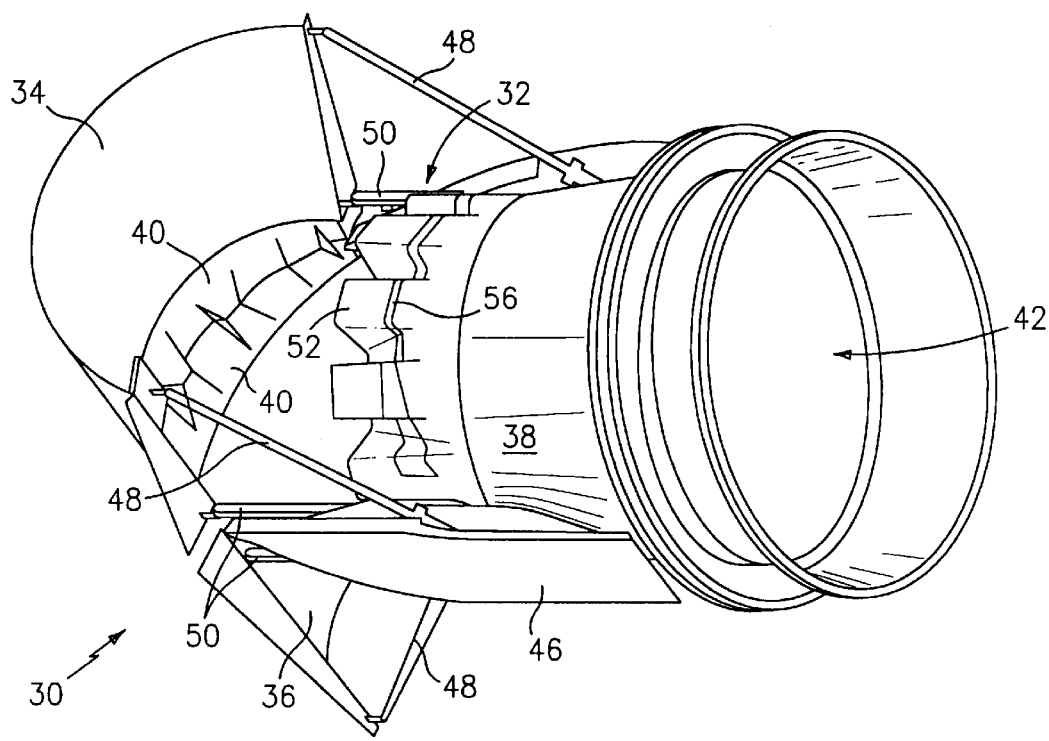
FIG. 7 is a perspective view of the contoured thrust reverser and lobed nozzle noise suppressor of the present invention in the deployed position.
Figure 6:
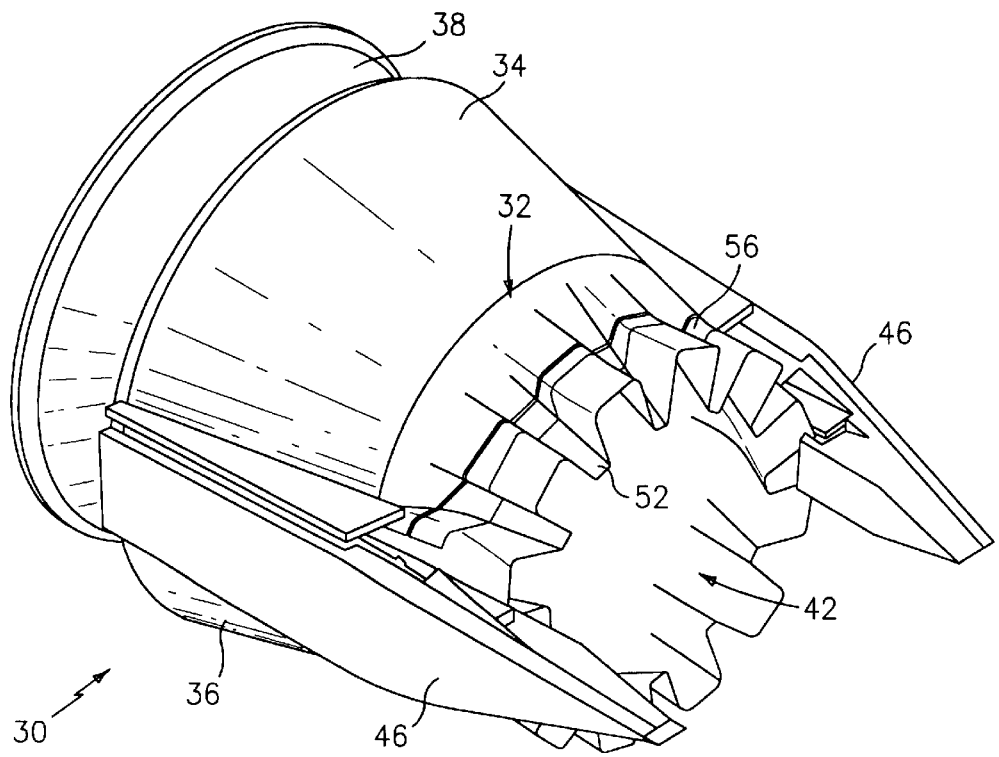
FIG. 6 is a perspective view of the contoured thrust reverser and lobed nozzle noise suppressor of the present invention in the stowed position.

FIGS. 4–11 show detailed views of the suppressor 30. The suppressor 30 comprises the conventional tailpipe frame 38 and the lobed nozzle 32 attached to an aft end of the frame. The lobed nozzle 32 and the tailpipe frame 38 together define an axial space or bore 42. A fore end of the frame 38 is configured for attachment to a main, fore portion of an engine 44 (via welding, connectors, or the like). Conventional thrust reverser actuation mechanisms 46 are affixed to the sides of the frame 38, and extend aft there from. The contoured blocker doors 34, 36 are each held by and supported between the actuation mechanisms 46 via a pair of fore connection arms 48 and a pair of aft connection arms 50. The contoured blocker doors 34, 36 preferably directly replace the thrust reverser's existing, non-contoured blocker doors. The actuation mechanisms 46 are hydraulically controllable to position the blocker doors 34, 36 at either a stowed position, as shown in FIGS. 4 and 6, or a deployed position, as shown in FIGS. 5 and 7.

Many different conventional post-exit thrust reversers can be used with the suppressor 30 of the present invention. A preferred thrust reverser mechanism (which is found on the Pratt & Whitney® JT8D-219 gas turbine engines) is disclosed in U.S. Pat. No. 4,005,836 to Mutch, entitled TARGET THRUST REVERSER, issued Feb. 1, 1977. The entirety of this patent is hereby incorporated by reference. Further detail regarding the construction and operation of the actuation mechanisms 46 may be found therein.

The lobed nozzle 32 provides a means for at least partially mixing engine exhaust (traveling down the bore or space 42 and out the lobed nozzle 32) with ambient air passing over the exterior of the lobed nozzle 32. The lobed nozzle 32 preferably has twelve lobes 52 and uses shallow contours preferably designed to work with the inverted flow profiles downstream of an internal mixer system (not shown) typically found in larger gas turbine engines such as the Pratt & Whitney® JT8D-219 engines. The lobes 52 provide significant low frequency jet noise reduction with minimal high frequency noise generation. The lobe angles are preferably conservative, with the penetration (in the space 42) being about 40%, and the outer lobe angle being about 6.8 degrees. It has been found that twelve lobes 52 provide a good balance between noise suppression and minimum cruise performance loss.

The preferred lobed nozzle 32 is further disclosed in U.S. Pat. No. 5,884,472 to Presz, Jr. et al. ("the '472 patent"), entitled ALTERNATING LOBED MIXER/EJECTOR CONCEPT SUPPRESSOR, issued Mar. 23, 1999. It is also disclosed in U.S. Pat. No. 5,761,900 to Presz, Jr. ("the '900 patent"), entitled TWO-STAGE MIXER EJECTOR SUPPRESSOR, issued Jun. 9, 1998. The entireties of both the '472 patent and the '900 patent are hereby incorporated by reference.

With reference to FIGS. 11–15 of the '472 patent, the lobed nozzle 32 of the present invention would comprise a ring of twelve of the shallow lobes 130a described therein, without the alternating, deep-penetrating lobes 130b. These shallow lobes are substantially the same as the lobes disclosed in the '900 patent, and the lobed nozzle 32 of the present invention is therefore preferably substantially similar to the lobed nozzle 30 shown in FIGS. 2–6 of the '900 patent, with the exception that the former preferably has twelve lobes as opposed to the former's ten. More specifically, each of the twelve lobes 52 of the lobed nozzle 32 of the present invention is preferably substantially similar to the mixing lobes 30a shown in FIGS. 4, 5 and 6A–6H in the '900 patent. For convenience, these views are duplicated in the present application as FIGS. 8, 9 and 10A–10H.

As should be appreciated, if different system characteristics are desired, the lobed nozzle 32 can have a different number of lobes, differently shaped lobes, or alternating lobes. For example, the alternating lobed nozzle disclosed in the '472 patent could be used, or the ten-lobe nozzle disclosed in the '900 patent could be used.

Though not shown in its entirety (for the sake of simplicity), the lobed nozzle ring 32 consists of twelve canted, convergent/divergent ("CD") lobes 52. One representative lobe 52 is, however, shown in FIGS. 8, 9 and 10A–10H. Each primary lobe's angles (i.e., with respect to the horizontal direction) on the secondary flow side (i.e., the lobe side toward the centerline of the nozzle that carries cool fan air) should be between fifteen degrees and forty-five degrees. This assures penetration of the cool secondary flow (i.e., fan air) into the hot primary flow (i.e., exhaust core flow) near the nozzle centerline. The lobe angles on the primary flow side (i.e., the lobe side toward the engine exhaust) should be between zero degrees and fifteen degrees, and more preferably, as mentioned above, about 6.8 degrees. These lower angles minimize the thrust loss due to flow divergents. These profile guidelines assure very little extra surface area when compared to that of a conventional round nozzle. Further detail about the design and configuration of the lobed nozzle 32 and lobes 52 may also be found in the '900 and '472 patents.

The thrust reverser actuation mechanisms 46 are hydraulically powered, and, as mentioned above, are controllable (via the airplane's conventional thrust reverser control mechanism, which is typically a set of electrically controlled hydraulic valves for controllably providing hydraulic pressure to the actuation mechanisms) to position the contoured blocker doors 34, 36 at either the deployed position or the stowed position. The stowed position is shown in FIGS. 3, 4 and 6. Here, the blocker doors 34, 36 lie back over and substantially surround a mid section of the frame 38. Side edges of the doors 34, 36 rest up against the actuation mechanisms 46, as best seen in FIG. 6, and the doors 34, 36 align with the cowling 54 of the fore portion of the engine 44, as best seen in FIG. 3. With the doors 34, 36 and the engine cowling 54 aligning, the surface of the engine nacelle has a substantially clean aerodynamic profile, such that ambient air is not disrupted when it passes over the engine nacelle.

As should be appreciated by comparing FIGS. 1 and 2 to FIGS. 4 and 5, the lobed nozzle 32 extends further towards the fore than the conventional round nozzle 22. The lobed nozzle 32 is longer that the conventional nozzle 22 because of the lobes 52. However, it must still terminate in approximately the same plane as the conventional nozzle 22 so that the conventional actuation mechanisms 46 have enough room to move the blocker doors 34, 36 to their deployed position. Because of this, the contoured blocker doors 34, 36, which are the same overall size as the conventional blocker doors 24, 26, overlap an external fore portion of the lobed nozzle 32 when in the stowed position.

The shape of the external surface of the lobed nozzle 32 is important for ensuring proper mixing of ambient air and engine exhaust. Therefore, the aft portions 40 of the contoured blocker doors 34, 36 are contoured to correspond in shape to the fore portions of the lobed nozzle 32 of which they overlap when in the stowed position. Thus, when the blocker doors 34, 36 are in the stowed position, as shown in FIGS. 4 and 6, the lobed or contoured aft portions 40 align and nestle with the lobed nozzle 32 to form a substantially continuous external lobed surface. This surface is aerodynamically configured to facilitate the lobed nozzle 32 in mixing ambient air and engine exhaust. Thus, the lobed nozzle 32, in conjunction with the overlapping blocker doors 34, 36, provides a mixing/noise reduction function.

Figure 11:
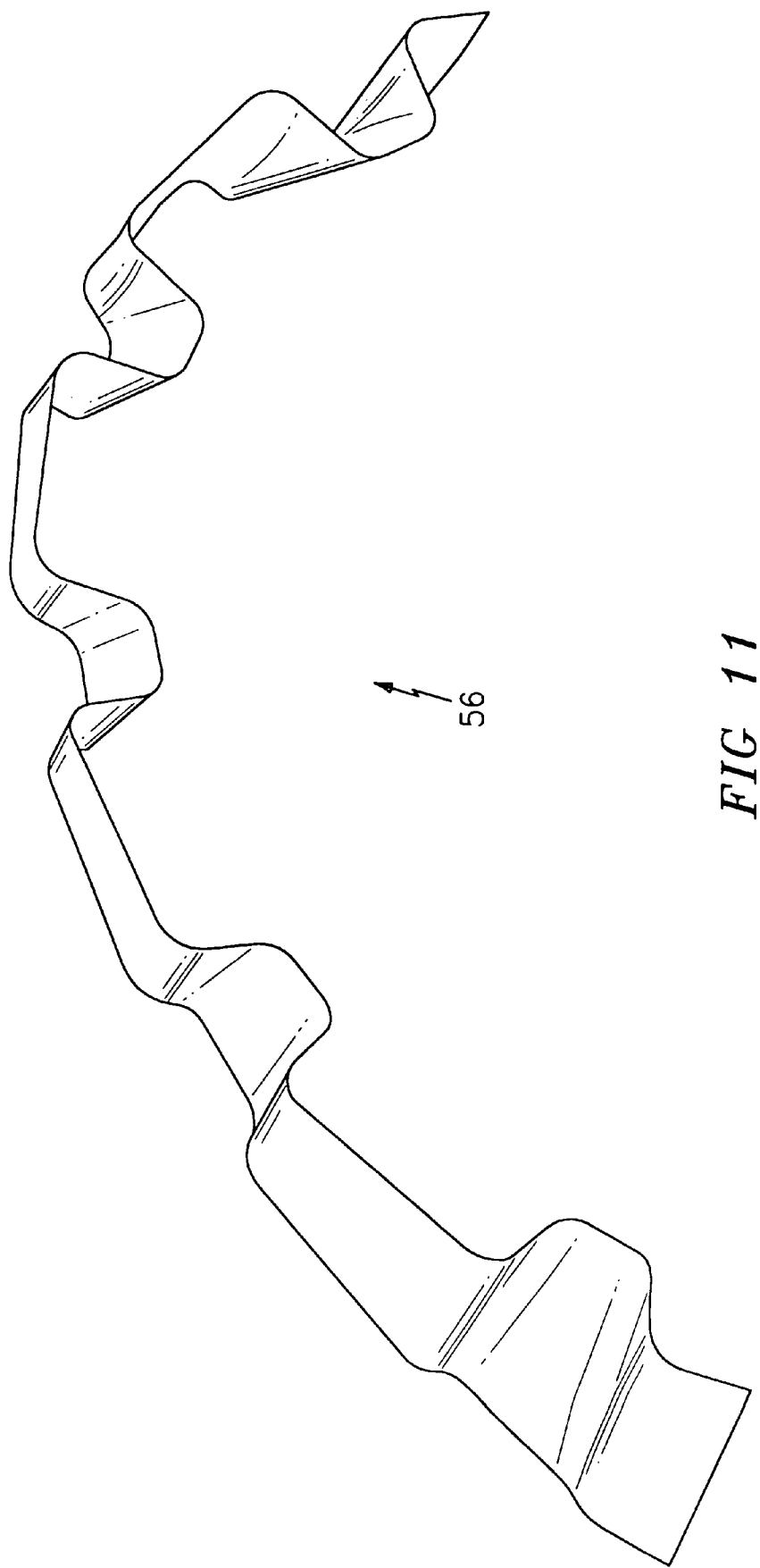
FIG. 11 is a perspective view of an aerodynamic fairing according to the present invention.

Although the blocker doors 34, 36 are typically quite thin, they still have some degree of thickness. Because of this, there will be a small step or discontinuity between the aft edges of the blocker doors 34, 36 and the lobed nozzle 32. Typically, this will not significantly adversely affect the aerodynamic properties of the lobed nozzle 32 (e.g., as ambient air passes from the blocker doors to the lobed nozzle). However, to ensure optimal performance, aerodynamic fairings 56 are preferably provided on the lobed nozzle 32 about the area where the blocker doors 34, 36 meet therewith. As shown in FIG. 11, each fairing 56 is a shaped or contoured skirt designed to be continuous in curvature to assure smooth flow accelerations from the contoured portions 40 of the blocker doors to the onset of the surface of the lobed nozzle 32. More specifically, each fairing 56 will have inner and outer annular surfaces. The inner annular surface is shaped to nestle with the annular portion of the lobed nozzle 32 over which it is placed. Additionally, the outer annular surface is shaped or configured to provide the above described function, namely, to enhance continuity between the blocker doors 34, 36 and the lobed nozzle 32. This helps establish good aerodynamic lines between the contoured blocker doors 34, 36 and the lobed nozzle 32 when the former are in the stowed position. It should be appreciated that each fairing can be a semi-annular piece (e.g., one for each blocker door) as shown in FIG. 11, or the fairing can be provided as a single annular ring (e.g., circumscribing the lobed nozzle 32). Also, the fairing or fairings 56 are attached to the lobed nozzle 32 via conventional means such as welding, fasteners, or a friction fit.

It should be appreciated that while standard, non-contoured blocking doors could conceivably be used (e.g., they would simply lay over the lobed nozzle), the effectiveness of the lobed nozzle would be greatly diminished thereby. Although the lobed nozzle would, to some extent, still mix ambient air with engine exhaust, the level of noise reduction would be reduced, and the lobed nozzle would likely produce a degree of disadvantageous high frequency noise. Additionally, the steps produced with the non-contoured blocking doors in the stowed position would produce significant cruise drag losses.

FIGS. 5 and 7 show the contoured blocker doors 34, 36 in the deployed position. Here, the actuation mechanisms 46 have been controlled to swing the blocker doors 34, 36 out and aft via the fore and aft swing arms 48, 50. The ends of the contoured aft portions 40 of the blocker doors are shaped to mate together, as best seen in FIG. 7, and the blocker doors thereby meet to form a fore-facing scoop just aft of the lobed nozzle 32. Any engine exhaust exiting the lobed nozzle 32 strikes the blocker doors 34, 36, and is redirected generally towards the fore. Additionally, the mating contoured portions 40 of the blocker doors help to further channel and redirect engine exhaust.

As best shown in FIG. 5, because the blocker doors 34, 36 meet to form a fore-facing scoop, the contoured aft portions 40 are wider in the middle than at the sides. Accordingly, as shown in FIG. 11, the fairings 56 are preferably conversely correspondingly shaped to be wider at the ends than in the middle. More specifically, because there is less lobed surface at the ends of the contoured aft portions 40 of the blocker doors, there has to be more at the ends of the fairings 56 to provide a substantially aerodynamically continuous surface.

All the components of the present invention can be made from standard materials suitable for their respective purposes. The lobed nozzle 32 is preferably made of titanium.

Lobed nozzles 32 and contoured blocker doors 34, 36 suitable for use in practicing the present invention, and marketed under the trademark CRALN™, are available from the common assignee of this application and the above mentioned patents, Stage III Technologies, L. C., of Las Vegas, Nev.

Although the lobed nozzle 32 and contoured blocker doors 34, 36 of the present invention have been illustrated as having certain shapes, one of ordinary skill in the art will appreciate that these could have other shapes or configurations, depending on the particular application (type of engine, type of plane, etc.), without departing from the spirit and scope of the invention. For example, the lobed nozzle 32 could be provided with fewer (or more) than the twelve lobes 52.

Also, as mentioned above, although the present invention has been illustrated as having or being used with a particular thrust reverser mechanism, one of ordinary skill in the art will appreciate that other thrust reverser mechanisms could be used without departing from the spirit and scope of the invention.

Since certain changes may be made in the above described contoured thrust reverser and lobed nozzle noise suppressor, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A gas turbine engine having an attached thrust reverser and noise suppressor comprising:
    a. a lobed nozzle attached to an aft end of an engine tailpipe frame, wherein the lobed nozzle is shaped to mix ambient air external to the frame with engine exhaust; and
    b. a post-exit thrust reverser comprising a pair of thrust reverser actuators attached to the frame and operably connected to a pair of contoured blocker doors, wherein the actuators are controllable to position the blocker doors at a deployed position in which the contoured blocker doors lie aft of the lobed nozzle and meet to form a fore-facing scoop, and wherein the actuators are controllable to position the blocker doors in a stowed position in which the blocker doors lie over the frame substantially fore of the lobed nozzle with an aft portion of each contoured blocker door overlapping the lobed nozzle; and
    c. wherein the portions of the contoured blocker doors that overlap the lobed nozzle are correspondingly shaped thereto, whereby the contoured blocker doors, when in the stowed position, nestle together with the lobed nozzle to form a substantially continuous external lobed surface.

2. The apparatus of claim 1 wherein the lobed nozzle comprises a ring of twelve identical convergent/divergent stationary mixing lobes.

3. The apparatus of claim 1 further comprising at least one aerodynamic fairing attached to the lobed nozzle proximate the area where the contoured blocker doors and lobed nozzle overlap, wherein the fairing helps establish continuity between the contoured blocker doors and the lobed nozzle when they overlap.

4. The apparatus of claim 1 wherein the contoured blocker doors, when in the stowed position, substantially align with an engine nacelle exterior surface, whereby air passing over the engine nacelle surface is not substantially disturbed when transitioning from the nacelle surface to the blocker doors.

5. A gas turbine engine having a thrust reverser and noise suppressor comprising:
    a. a lobed nozzle attached to an aft end of an engine tailpipe frame; and
    b. a pair of contoured blocker doors positionable, via a post-exit thrust reverser actuation mechanism attached to the frame, at a deployed position, wherein the contoured blocker doors lie aft of the lobed nozzle and meet to form a fore-facing scoop for redirecting engine thrust, and the blocker doors are positionable via the actuation mechanism into a stowed position, wherein the contoured blocker doors lie over the frame substantially fore of the lobed nozzle and with aft portions of the contoured blocker doors overlapping the lobed nozzle;
    c. wherein the aft portions of the contoured blocker are contoured to correspond in shape to the respective portions of the lobed nozzle of which they overlap, whereby the contoured blocker doors, when in the stowed position, nestle with the lobed nozzle to form a substantially continuous external lobed surface for facilitating mixing of ambient air and engine exhaust.

6. The apparatus of claim 5 further comprising at least one aerodynamic fairing attached to the lobed nozzle proximate the area where the contoured blocker doors and lobed nozzle overlap, wherein the fairing is configured to enhance continuity between the contoured blocker doors and the lobed nozzle when they overlap.

7. The apparatus of claim 5 wherein the lobed nozzle comprises a ring of twelve identical convergent/divergent stationary mixing lobes.

8. The apparatus of claim 5 wherein the contoured blocker doors, when in the stowed position, substantially align with an engine nacelle exterior surface, whereby air passing over the engine nacelle surface is not substantially disturbed when transitioning from the nacelle surface to the blocker doors.

9. A gas turbine engine having a thrust reverser and noise suppressor comprising:
    a. a tailpipe frame and a lobed nozzle attached to an aft end thereof, wherein the lobed nozzle and the tailpipe frame define an axial space, and wherein the lobed nozzle is shaped to mix ambient air external to the frame with engine exhaust traveling through the space; and b. a pair of post-exit thrust reverser actuation mechanisms attached external to the frame and operably connected to a pair of contoured blocker doors, wherein:
  i. the actuation mechanisms are controllable to position the contoured blocker doors at a stowed position, wherein the contoured blocker doors lie over the frame and partially overlap the lobed nozzle, and at a deployed position, wherein the contoured blocker doors lie aft of the lobed nozzle and meet to form a generally fore-facing scoop; and
  ii. the portions of the contoured blocker doors that overlap the lobed nozzle are correspondingly shaped thereto, wherein when the contoured blocker doors are in the stowed position the doors nestle with the lobed nozzle to form a substantially continuous external lobed surface, wherein when the contoured blocker doors are in the deployed position, the doors redirect any engine exhaust exiting the lobed nozzle towards the fore, and when the contoured blocker doors are in the stowed position, the lobed nozzle, in conjunction with the overlapping contoured blocker doors, mixes ambient air with engine exhaust, thereby reducing engine noise.

10. The apparatus of claim 9 further comprising at least one aerodynamic fairing attached to the lobed nozzle proximate the area where the contoured blocker doors and lobed nozzle overlap, wherein the fairing is configured to enhance continuity between the contoured blocker doors and the lobed nozzle when they overlap.

11. The apparatus of claim 9 wherein the lobed nozzle comprises a ring of twelve identical convergent/divergent stationary mixing lobes.

12. The apparatus of claim 9 wherein the contoured blocker doors, when in the stowed position, substantially align with an engine nacelle exterior surface, whereby air passing over the engine nacelle surface is not substantially disturbed when transitioning from the nacelle surface to the blocker doors.

* * * * *